(12) United States Patent
Ditter et al.

(10) Patent No.: US 11,111,841 B2
(45) Date of Patent: Sep. 7, 2021

(54) FRAME DEVICE AND FAN MODULE WITH SUCH A FRAME DEVICE

(71) Applicant: Brose Fahrzeugteile GmbH & Co. Kommanditgesellschaft, Würzburg, Würzburg (DE)

(72) Inventors: Frank Ditter, Estenfeld (DE); Andre Evers, Oldenburg (DE); Antje Findeisen, Oldenburg (DE)

(73) Assignee: Brose Fahrzeugteile GmbH & Co. Kommanditgesellschaft, Wiirzburg, Wiirzburg (DE)

( * ) Notice: Subject to any disclaimer, the term of this patent is extended or adjusted under 35 U.S.C. 154(b) by 0 days.

(21) Appl. No.: 16/548,000

(22) Filed: Aug. 22, 2019

(65) Prior Publication Data

US 2020/0063642 A1 Feb. 27, 2020

(30) Foreign Application Priority Data

Aug. 23, 2018 (DE) ...................... 10 2018 214 283.1

(51) Int. Cl.
| | | |
|---|---|---|
| F02B 29/04 | (2006.01) | |
| F01P 3/18 | (2006.01) | |
| F01P 11/10 | (2006.01) | |
| F04D 29/08 | (2006.01) | |
| F04D 29/64 | (2006.01) | |

(52) U.S. Cl.
CPC ............ *F02B 29/0468* (2013.01); *F01P 3/18* (2013.01); *F01P 11/10* (2013.01); *F02B 29/045* (2013.01); *F02B 29/0431* (2013.01); *F04D 29/08* (2013.01); *F04D 29/646* (2013.01); *F01P 2003/185* (2013.01); *F01P 2070/52* (2013.01)

(58) Field of Classification Search
CPC ................ F02B 29/0468; F02B 29/045; F02B 29/0431; F01P 3/18; F01P 2003/185; F01P 11/10; F01P 2070/52; F04D 29/08; F04D 29/646
See application file for complete search history.

(56) References Cited

U.S. PATENT DOCUMENTS

| 4,522,160 A | 6/1985 | Speers et al. |
| 5,566,954 A * | 10/1996 | Hahn ...................... F16J 15/025 |
| | | 123/41.49 |

(Continued)

FOREIGN PATENT DOCUMENTS

| CN | 104727919 A | 6/2015 |
| CN | 205297726 U | 6/2016 |

(Continued)

OTHER PUBLICATIONS

European Search Report; Application EP19190694.0; dated Nov. 6, 2019, 6 pages.

(Continued)

*Primary Examiner* — Jacob M Amick
(74) *Attorney, Agent, or Firm* — Brooks Kushman P.C.

(57) ABSTRACT

A frame device for a fan module for a main cooler and for a charge air cooler of a motor vehicle, comprising a main frame for the main cooler and a charge air cooler, separate from the latter, for the charge air cooler, wherein a seal is provided between the main frame and the charge air frame. Furthermore, the invention relates to a fan module with such a frame device.

16 Claims, 7 Drawing Sheets

(56) References Cited

U.S. PATENT DOCUMENTS

2004/0211607 A1   10/2004  Sasano et al.
2016/0363039 A1   12/2016  Sovine et al.
2017/0226920 A1*  8/2017  Sovine ..................... F01P 5/06

FOREIGN PATENT DOCUMENTS

| CN | 106042901 A | 10/2016 |
| --- | --- | --- |
| DE | 10233859 A1 | 1/2004 |
| DE | 69813784 T2 | 3/2004 |
| DE | 102004019667 A1 | 12/2004 |
| DE | 102005004521 A1 | 8/2005 |
| DE | 102005044559 A1 | 3/2007 |
| DE | 102007062346 A1 | 6/2009 |
| DE | 102010039311 A1 | 2/2012 |
| DE | 102012112358 A1 | 6/2013 |
| DE | 102012202584 A1 | 8/2013 |

OTHER PUBLICATIONS

Chinese Office Action; Application 201910778007.9; dated Feb. 3, 2021, 9 pages.

* cited by examiner

FRAME DEVICE AND FAN MODULE WITH SUCH A FRAME DEVICE

CROSS-REFERENCE TO RELATED APPLICATIONS

This application claims priority to German patent application Serial No. DE 10 2018 214 283.1 filed Aug. 23, 2018, the disclosure of which is hereby incorporated in its entirety by reference herein.

TECHNICAL FIELD

The invention relates to a frame device for a fan module for a main cooler and for a charge air cooler of a motor vehicle. It further relates to a fan module with such a frame device.

BACKGROUND

Some motor vehicles have, an addition to a main cooler (main water cooler) for cooling the engine, a charge air cooler for cooling the air supplied to the engine of the motor vehicle. The two coolers, i.e. the main cooler and the charge air cooler, are arranged for example on top of one another. The main cooler and the charge air cooler are however fastened to different devices in the engine compartment, so that a relative movement of the two coolers can occur when the motor vehicle is in operation.

Typically, a common fan module is provided for supplying both coolers with an air flow. On account of the relative movement between the coolers occurring during operation of the motor vehicle and on account of component tolerances and possibly on account of predefined assembly clearance tolerances, air gaps between a frame and the coolers would have to be selected correspondingly large. This disadvantageously results, however, in comparatively large leakage air flows and thus to a reduced cooling capacity.

The problem underlying the invention is to provide a suitable frame device for a fan module, which supplies both the charge air cooler and the main cooler with an air flow. In particular, leakage air flows are intended to be avoided. Furthermore, a fan module is with such a frame device is to be specified.

SUMMARY

According to the invention, this problem is solved with regard to the frame device by the features of claim 1. With regard to the fan module, the problem is solved according to the invention by the features of claim 8. Advantageous embodiments and developments are the subject-matter of the sub-claims.

The frame device is provided and equipped for use in a fan module, wherein the fan module is in turn provided for supplying a main cooler and a charge air cooler of a motor vehicle with an air flow. The frame device comprises a main frame for the main cooler, wherein the main frame is in particular fastened to the main cooler.

Furthermore, the frame device comprises a charge air frame for the charge air cooler. A seal is provided between the two frames, i.e. between the main frame and the charge air frame, by means of which seal the two frames are coupled together.

In particular, a leakage air flow between the two frames of the frame device is prevented by means of the seal. In addition, it is made possible for the main frame to be fastened to the main cooler and the charge air frame to be fastened to the charge air cooler. A relative movement between the coolers and thus between the frames occurring during operation of the motor vehicle is advantageously compensated for by means of the seal. On account of the arrangement of the seal between the two frames, allowance is also made for component tolerances, in particular component tolerances of the devices carrying the coolers and of the fastening points of the frames to the respective cooler.

In summary, the frame device is constituted in a multi-part form. A first frame forms the main frame, a second frame, separate from the latter, forms the charge air frame. A seal is provided between the two frames.

A single electric motor or two electric motors are advantageously fastened to the main frame, which drives and/or drive in each case a fan wheel for the generation of the air flow. In addition or alternatively, an electric motor with a fan wheel coupled thereto is fastened to the charge air frame.

A sealing structure is expediently provided on the respective frame for the cooler assigned in each case, so that leakage air flows are avoided. The sealing structures are however recessed in the region of the seal, so that the air flow produced by means of the fan module is supplied to both coolers.

According to a first variant of the frame device, the seal is formed by means of a separate and elastic component. The component has a profile. In summary, the seal is formed by means of a profile part. The profile part is preferably fastened either to the charge air frame or to the main frame. In an alternative embodiment, the profile part is fastened to both frames, which can also be advantageous in the case of increased assembly costs.

For example, the profile part is formed from an elastomer or from a foam. In particular, the profile part is formed by means of ethylene-propylene-diene rubber (EPDM). At all events, the profile part is at least slightly deformable and not rigid. Moreover, the material must not be damaged by the temperatures occurring during operation, in particular up to 150° C.

For the fastening of the profile part, the corresponding frame comprises, according to a suitable embodiment, holding elements at its border facing the respective other frame. In particular, the latter are formed hook-shaped, so that the profile part is held frictionally locked and in a form-fit manner on account of the at least slight deformability of the profile part. A displacement of the profile part is thus prevented.

According to an expedient development, the profile part comprises a first profile section, which surrounds the border of the frame, to which border the profile part is held. The first profile section has a profile contour at its wall lying against the border, which profile contour is constituted for example as ribs extending in the profile longitudinal direction, or which is constituted hook-shaped in a plane to the profile longitudinal direction. The border of the frame to which the profile part is held has a joining contour, which preferably corresponds to the profile contour of the first profile section and which extends in particular continuously along the border. On account of the profile contour engaging around the joining contour, slipping-off of the first profile region from the border and/or twisting-off (buckling) of the profile part from the border with an axis of rotation along one of the edges of the border, which edge lies opposite the other frame, is prevented.

Joining the contour of the border of the corresponding frame and the profile contour of the first profile section corresponding thereto is preferably provided in addition to the holding elements, but the contours can alone hold the profile part also as an alternative to the holding elements.

According to a suitable embodiment, the profile part comprises a second profile section, which is constituted hose-shaped (tubular) in cross-section, i.e. in an intersecting plane perpendicular to the profile longitudinal axis. Alternatively, the second profile section is for example arc-shaped, rectangular or L-shaped in cross-section. At all events, this second profile section lies against the frame to which the profile part is not fastened. In other words, the second profile section lies against the main frame if the profile part is fastened to the charge air frame, or the profile part lies against the charge air frame if the profile part is fastened to the main frame.

The second profile section has an extension in a vertical direction from the charge air frame to the main frame, so that the second profile section in the assembly state is buckled relative to the vertical direction. The second profile section expediently comprises predefined buckling points for defined buckling. The predefined buckling points are provided for example by a profile wall constituted thinner in a localized form (in sections).

In this way, the profile part is held to the frame against which the profile part lies, by means of suitably strong frictional engagement, against a displacement in a direction perpendicular to the vertical direction. In addition, in the case of a relative movement of the two frames during operation of the motor vehicle, any occurring change in the spacing of the frames due to buckling or removal of buckling of the profile part can be compensated for. It is also advantageously made possible for the profile part to be used for different vehicle models with different spacings between the coolers, in that the profile part is correspondingly buckled during its assembly.

According to an expedient development, as an alternative to or preferably in addition to the frictionally engaged holding of the profile part by its buckling, a holding contour is arranged, in particular integrally formed, on the frame against which the profile part lies. The holding contour serves to provide a securing means against slipping of the profile part towards the coolers.

For example, the holding contour is constituted for this purpose as a number of tongue-like extensions, which surrounds the profile part at least in sections on the side thereof facing the coolers, or on account of which extensions a frictional force preventing slipping is brought about in the event of slipping of the profile part towards the cooler.

In summary, the holding contour is arranged on the charge air frame if the profile part is fastened to the main frame, or the holding contour is arranged on the main frame if the profile part is fastened to the charge air frame.

According to a second variant of the frame device, both the main frame and the charge air frame comprise a wall section extending towards the respective other frame. Each of the wall sections has, in particular at the free end side, a labyrinth contour, which intermesh with one another thereby forming a labyrinth seal. In other words, the two labyrinth contours engage into one another, so that a labyrinth seal is formed.

The wall sections with the respective contours are preferably integrally formed on the respective frame.

The relative movement during operation of the motor vehicle and the component tolerances are compensated for by a clearance, i.e., a moveability, of the two contours with respect to one another. The clearance is however constituted small such that a sealing function continues to be reliably performed.

The frame device comprises for example both a labyrinth seal as well as a seal formed by means of the profile part.

According to an advantageous embodiment, a fan module for a main cooler and for a charge air cooler of a motor vehicle comprises a frame device in one of the variants represented above. In particular, the frame device is constituted in a multi-part form. Thus, it comprises a main frame and a charge air frame separate from the latter, wherein a seal is provided between these frames.

BRIEF DESCRIPTION OF THE DRAWINGS

Examples of embodiment of the invention are explained in greater detail below with the aid of a drawing. In the figures.

Parts and sizes corresponding to one another are always provided with the same reference numbers in all the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
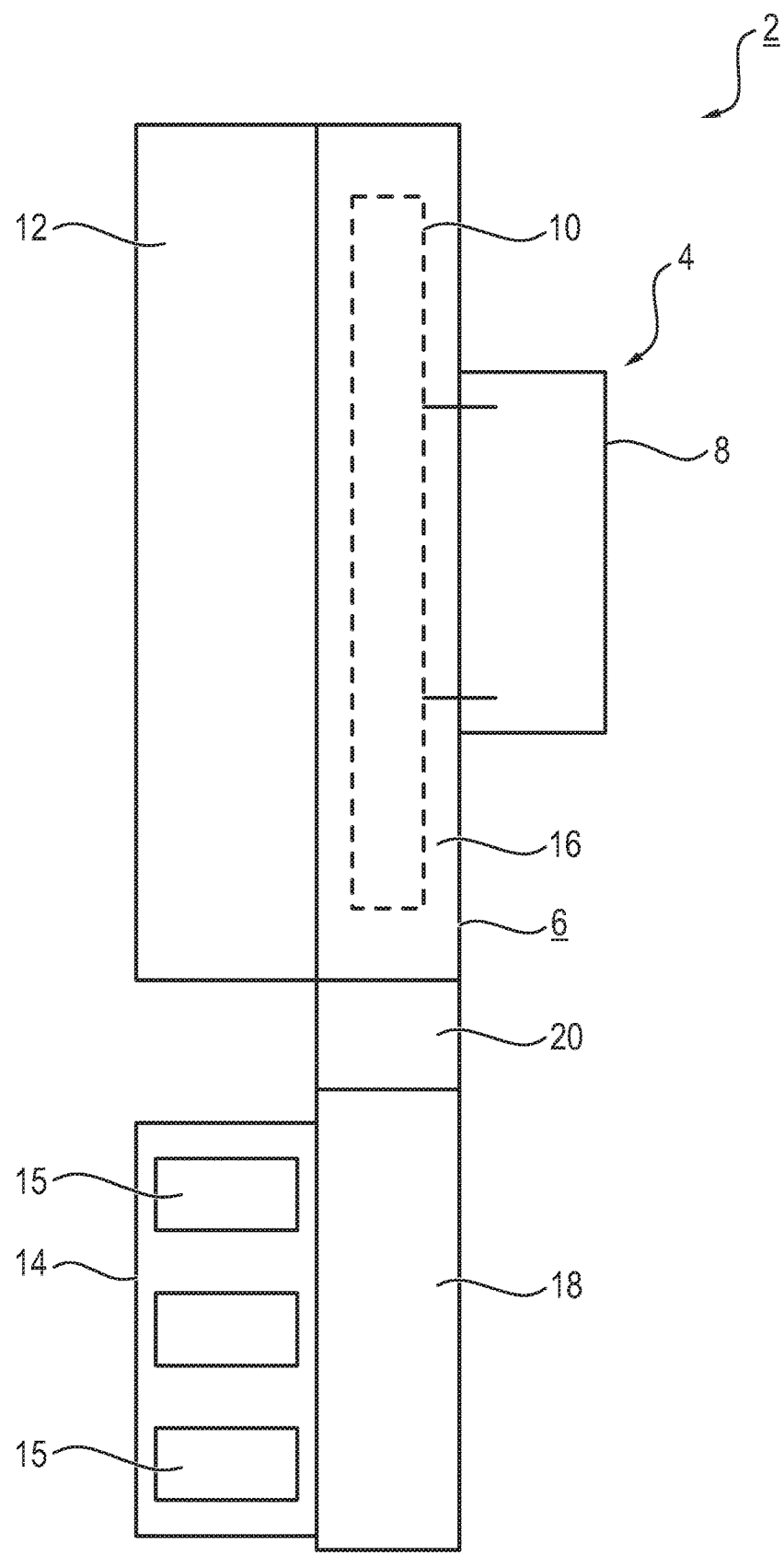
FIG. 1 shows in a diagrammatic side view a cooler arrangement with a main cooler and a charge air cooler, wherein both coolers are provided with a common fan module, and wherein the fan module comprises a multi-part frame device with a main frame for the main cooler and with a charge air frame for the charge air cooler.

FIG. 1 shows diagrammatically in a side view a cooling arrangement 2, which comprises a fan module with a frame device 6. A drive, constituted here as an electric motor 8, is fastened to frame device 6 and drives a fan wheel 10 in rotation. Fan wheel 10 is concealed by frame device 6 in the side view, for which reason fan wheel 10 is represented with a dashed line. Fan module 4 serves the purpose of sucking in air, in order that both a main cooler 12 and a charge air cooler 14 of a motor vehicle not represented further are supplied with an air flow.

Tubes 15 of a heat exchanger of charge air cooler 14 are shown in FIGS. 1 to 3, 5 and 7. Main cooler 12 and charge air cooler 14 are mounted on different holding devices of the motor vehicle in a manner not further represented. On account of this, a relative movement between main cooler 12 and charge air cooler 14 can occur during the operation of the motor vehicle.

Frame device 6 is fastened both to main cooler 12 and also to charge air cooler 14. To prevent leakage air flows, frame device 6 is provided with sealing structures not represented further. Frame device 6 is constituted in a multi-part form. It comprises a first component designated as main frame 16 for main cooler 12 and a second component designated as charge air frame 18 for charge air cooler 14. The two frames 16 and 18 are fastened to respective cooler 12 and 14 and are coupled together via a seal 20. Seal 20 is at least slightly flexible and/or moveable, so that the relative movement between the two coolers 12, 14 and therefore between the two frames 16, 18 fastened to the latter brought about by the operation of the motor vehicle is compensated for.

In summary, fan module 4 comprises frame device 6, electric motor 8 and fan wheel 10.

Figure 2:
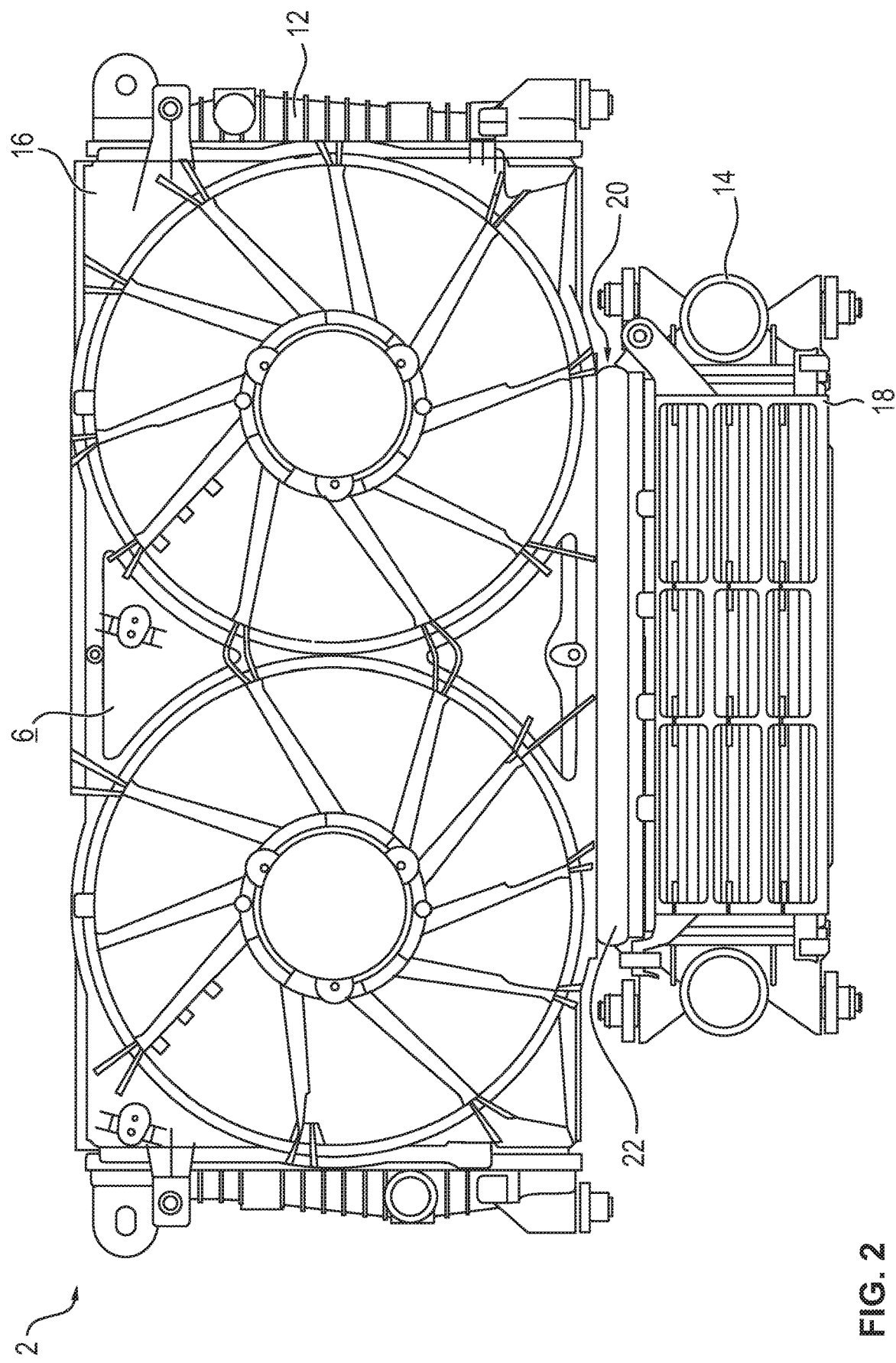
FIG. 2 shows in a front view the cooler arrangement with a first variant of the frame device, wherein a seal formed by means of a profile part is arranged between the main frame and the charge air frame.
Figure 3:
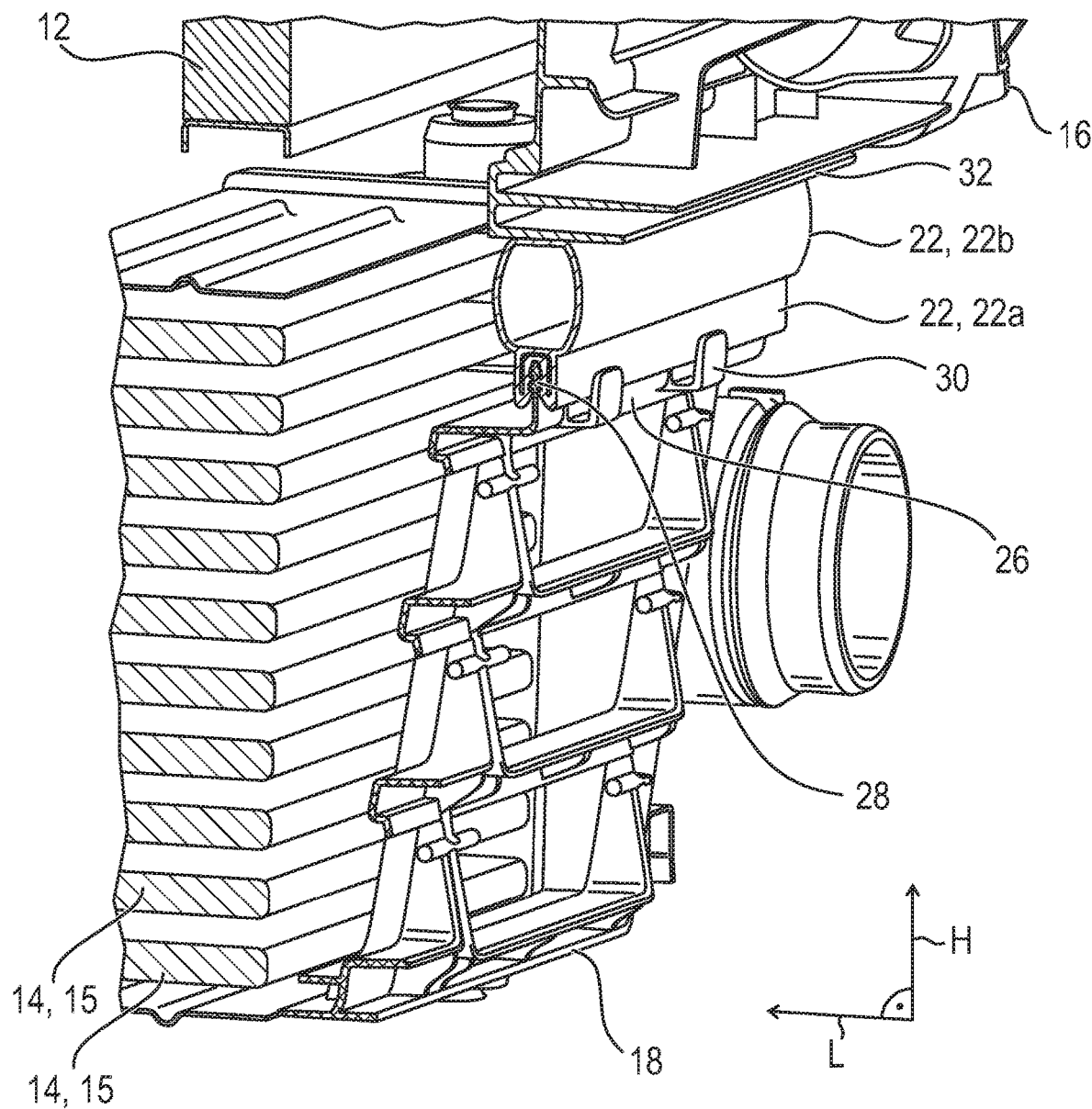
FIG. 3 shows, on a magnified scale, a cross-section through the cooler arrangement according to FIG. 2, wherein the profile part is held to the charge air frame by means hook-shaped holding elements.
Figure 4:
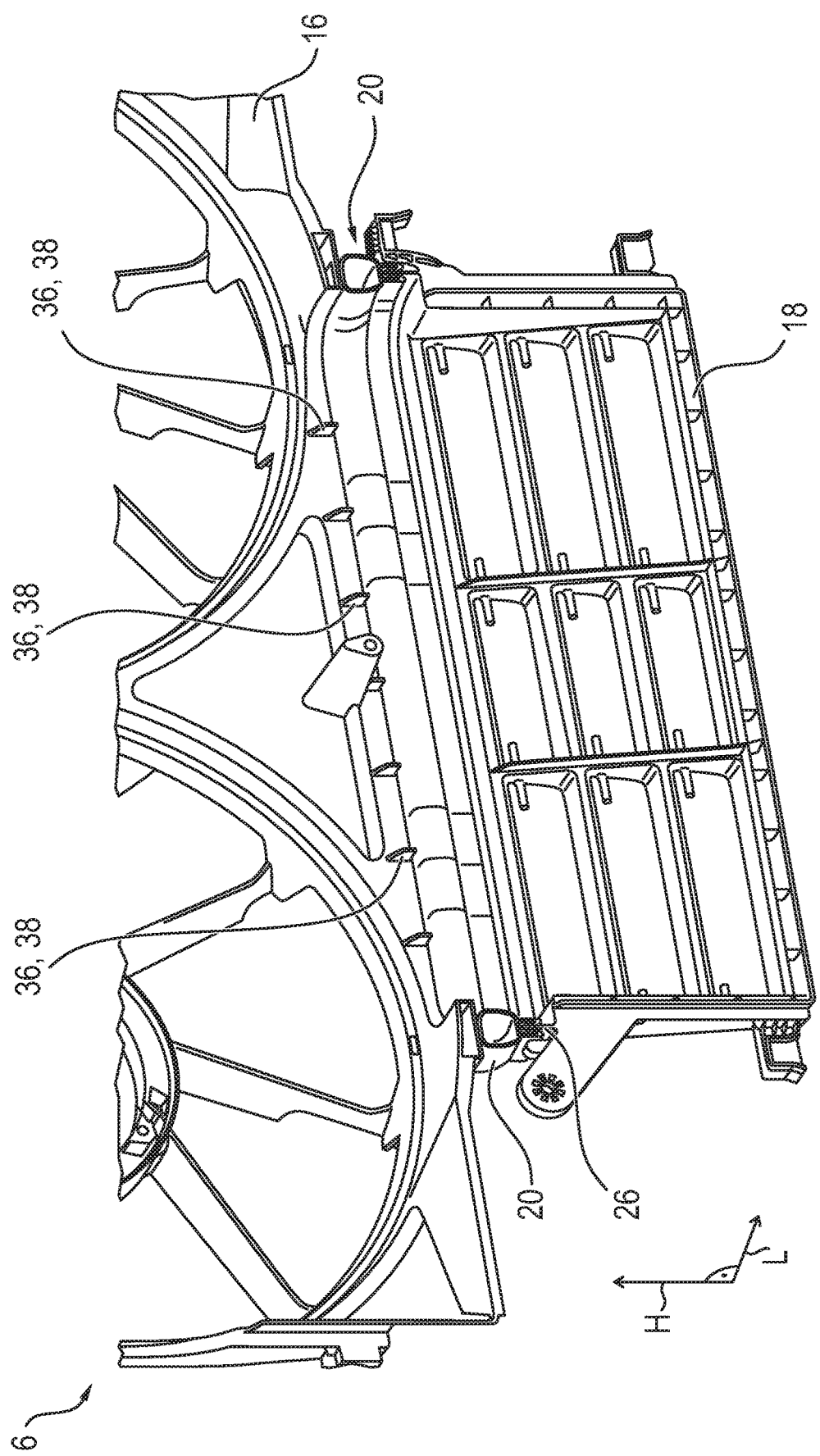
FIG. 4 shows the frame device in a perspective view, wherein a holding contour for providing securing means against slipping of the profile part is arranged on the main frame.

A first variant of frame device 6 is represented in FIGS. 2 to 4. Frame device 6 is equipped to carry two electric motors 8 with in each case a fan wheel 10 coupled to the latter. Electric motors 8 and assigned fan wheels 10 are fastened to main frame 16. In alternatives of this variant not represented further, electric motor 8 driving a fan wheel 10 in rotation is alternatively or additionally fastened to charge air frame 18.

Seal 20 is formed by means of a separate and elastic profile part 22. Profile part 22 is rubber-like and made of ethylene-propylene-diene rubber. Profile part 22 comprises a first profile section 22a, which is fastened to charge air frame 18. This first profile section 22a has in cross-section a U-shape with two parallel U-legs and a U-connection leg connecting the latter. Arranged on mutually facing sides of each U-leg is a profile contour 24, which comprises triangular extensions rising up with respect to the legs in a plane perpendicular to the profile longitudinal direction, wherein the triangular side facing the U-connection leg runs parallel to the latter. In the assembled state, the two U-legs engage around border 26 of the charge air frame. Profile contour 24 engages around a rib-like joining contour 28 arranged on border 26 and extending parallel to an edge of border 26. In the assembled state, profile part 22 on charge air frame 18 is thus secured against pulling-off and/or against twisting-off with an axis of rotation parallel to the edge of border 26.

In addition, charge air frame 18 comprises hook-shaped holding elements 30 on its border 26 facing main frame 16. Hook-shaped holding elements 30 surround the U-leg of first profile section 22a of profile part 22, said U-leg lying against the side of border 26 facing away from charge air cooler 14, thereby forming a frictional engagement (force-fit). For example, hook-shaped holding elements 30 are bent at least slightly towards border 26 during assembly and are pressed into the profile part, so that a form-fit connection is formed.

Figure 6C:
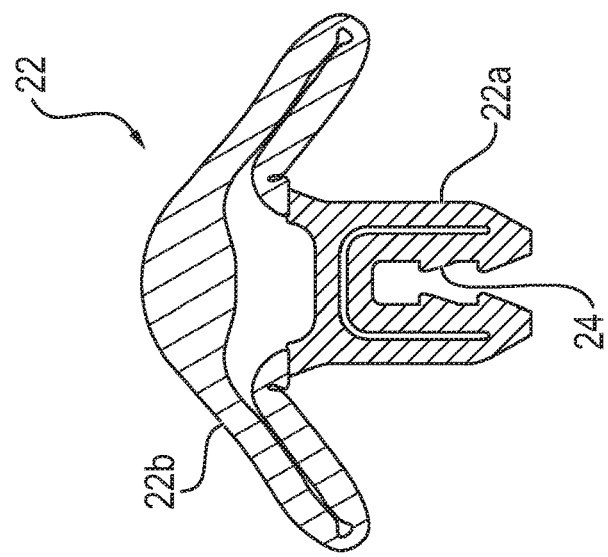
FIGS. 6a to 6c show the profile part of the seal in a cross-section in the normal state, in the partially buckled state and respectively in the completely buckled state.
Figure 6B:
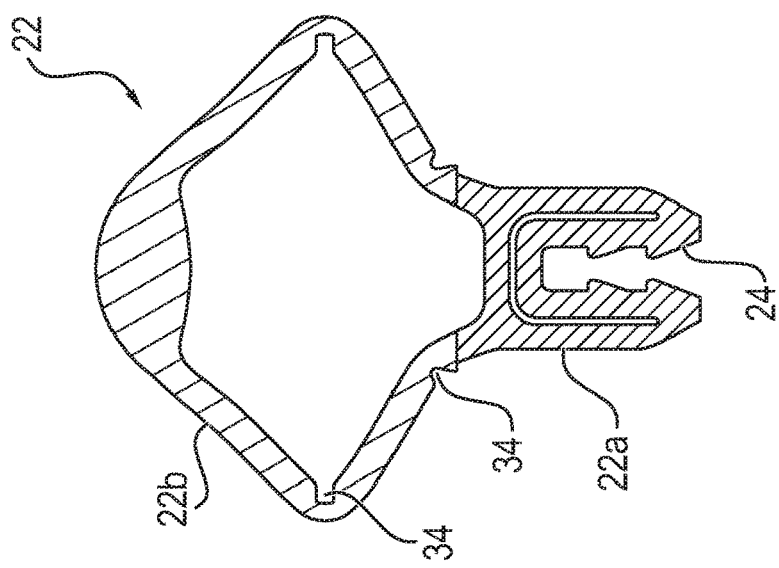
Figure 6A:
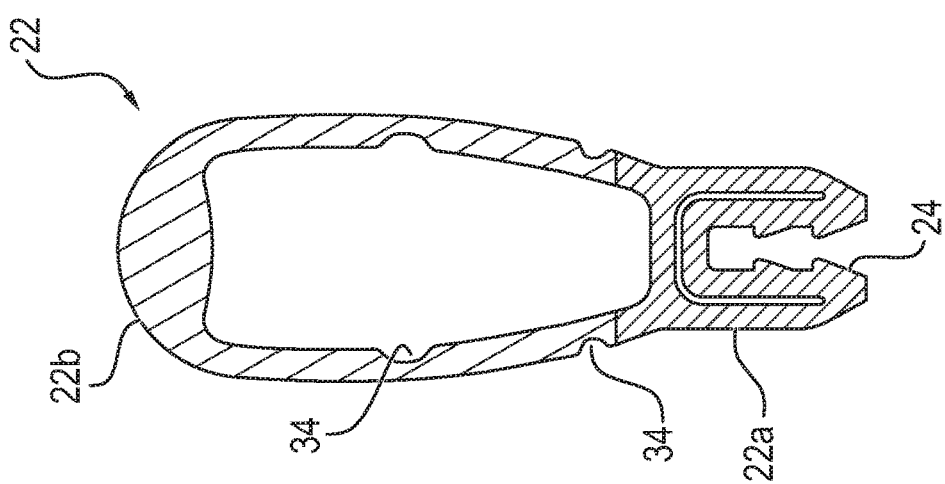

Profile part 22 comprises a hose-like second profile section 22b, which is integrally formed on first profile section 22a. Second profile section 22b lies against a seating 32 of main frame 16. Second profile section 22b extends in a vertical direction H from charge air frame 18 to main frame 16. Second profile section 22b has an extension in this direction, in such a way that in the assembled state it is slightly buckled. As can be seen in FIGS. 6a to 6c, second profile section 22b comprises predefined buckling points 34. The buckling of second profile section 22b thus takes place in a defined manner.

Furthermore, a holding contour 36 is arranged on main frame 16, which secures the profile part against slipping towards coolers 12, 14. For this purpose, holding contour 36 comprises a number of fin-shaped extensions 38, which extend from main frame 16 to coolers 12, 14. Extensions 38 lie against second profile section 22b and thus increase a frictional engagement acting against slipping.

Figure 5:
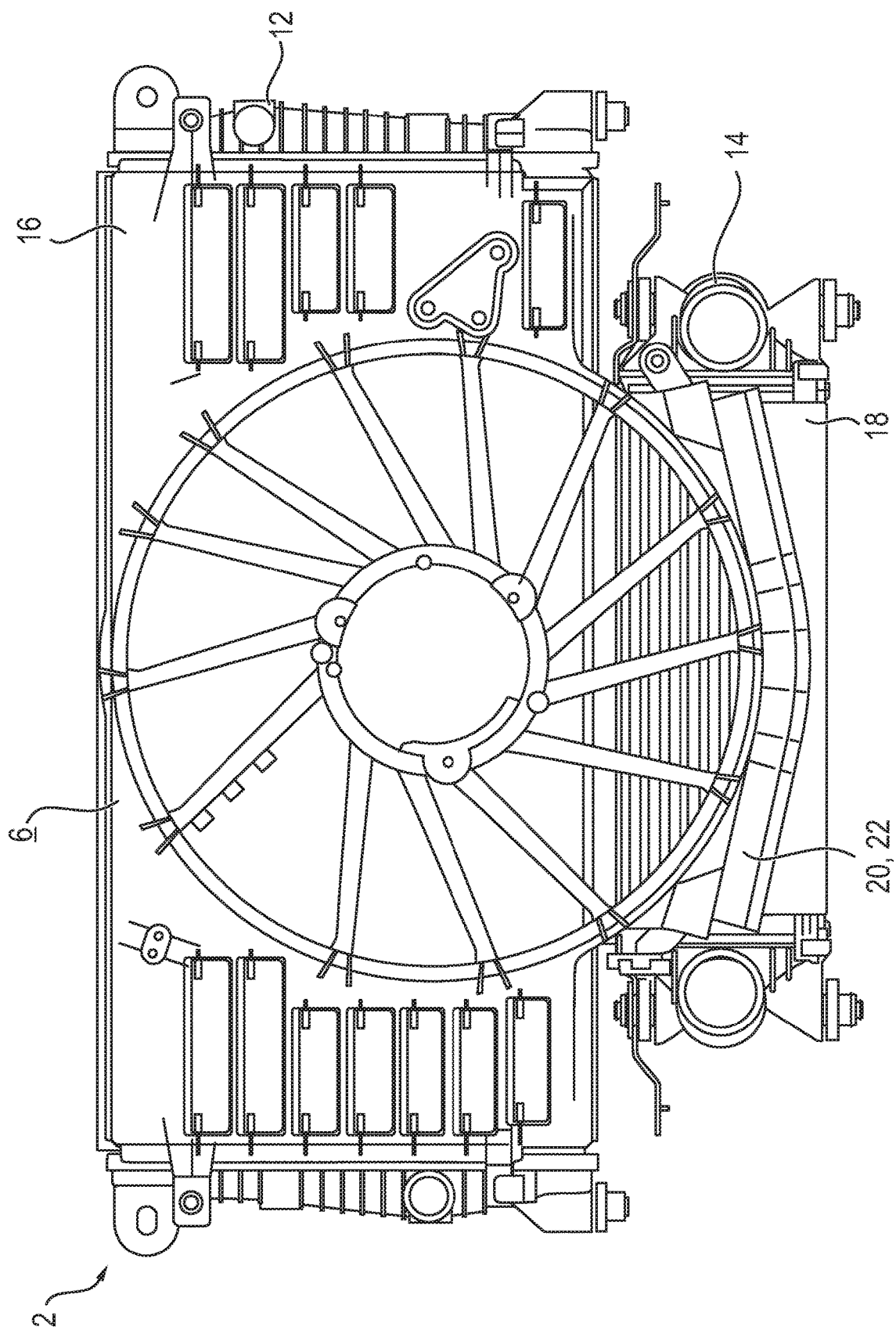
FIG. 5 shows, in a front view, an alternative embodiment of the first variant of the frame device, wherein the frame device is provided for a fan module with only one fan wheel.

FIG. 5 shows an alternative embodiment of fan module 2. Here, frame device 6 is equipped to carry a single electric motor 8 with fan wheel 10 which can be driven in rotation by the latter. Main frame 16, on account of its extension, partially overlaps charge air cooler 14. In addition, borders 26 of frames 16 and 18 are arc-shaped. Profile part 22, on account of its easy deformability, can also be used for this embodiment of frames 16 and 18. The aforementioned embodiments thus apply analogously with respect to profile part 22 and its coupling with the two frames 16 and 18.

FIGS. 6a to 6c show profile part 22 in the non-buckled, partially buckled and completely buckled state of its second profile section 22b. The relative movement between main frame 16 and charge air frame 18 during the operation of the motor vehicle is duly compensated for by further buckling or by removal of buckling.

Figure 7:
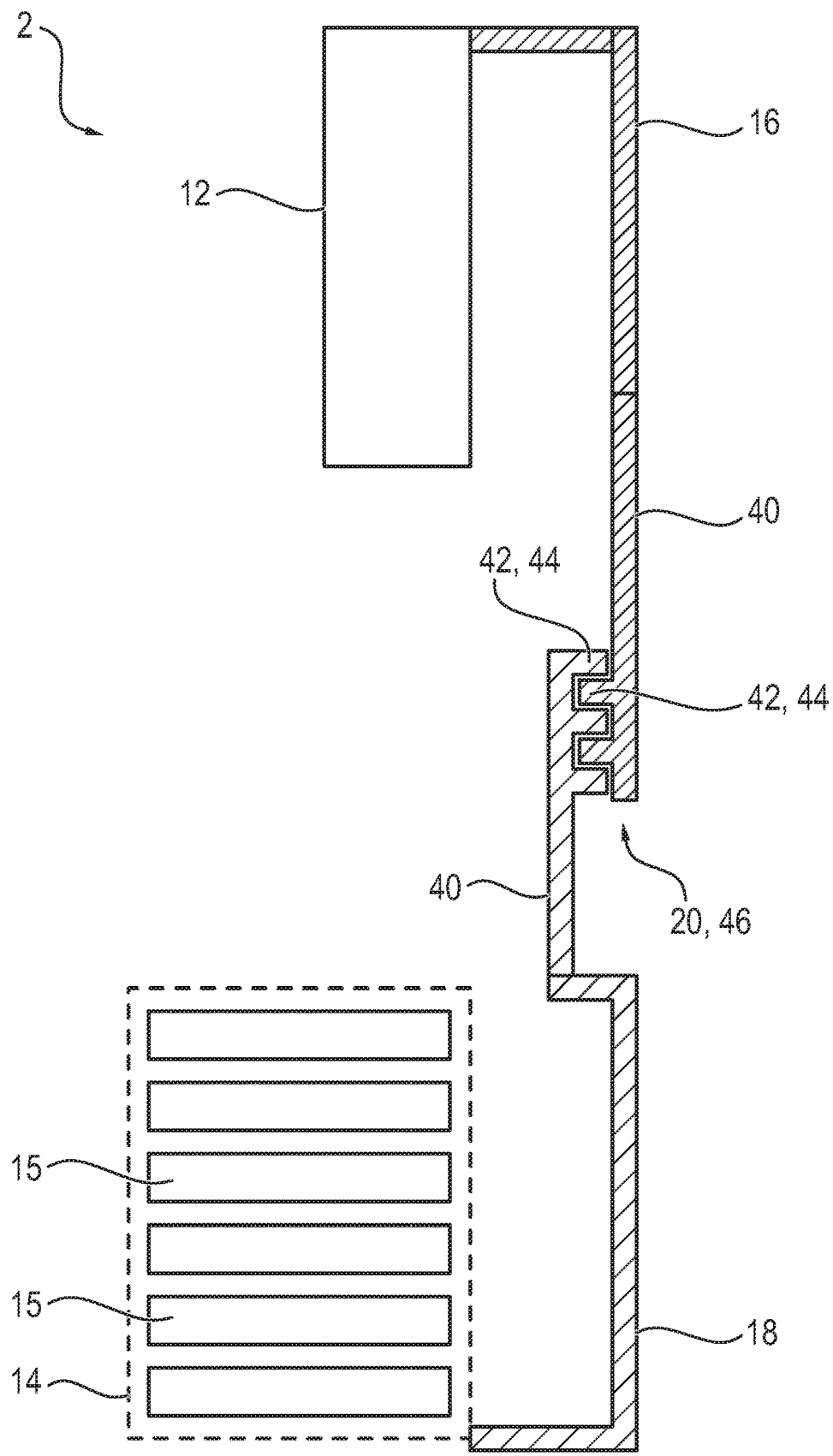
FIG. 7 shows, in a diagrammatic representation, a second variant of the frame device, wherein wall sections of the main frame and of the charge air frame each have an integrally formed labyrinth contour, which labyrinth contours engage (are engaged) with one another thereby forming a labyrinth seal.

A second variant of frame device 6 is represented in FIG. 7. Main frame 16 and charge air frame 18 comprise on mutually facing end sides an integrally formed wall section 40 extending towards the respective other frame 18 and 16. The two wall sections 40 overlap in sections in a frame normal designated as longitudinal direction L, said frame normal running perpendicular to vertical direction H and from main frame 16 to main cooler 12. Wall sections 40 each comprise on the mutually facing sides, in the overlapping region, a labyrinth contour 42 with rib-like shaped elements 44, which intermesh with one another thereby forming a labyrinth seal 46. In summary, seal 20 is constituted as a labyrinth seal 46.

Labyrinth seal 46 represented in FIG. 7 is represented in a representative and schematic manner. Alternative embodiments of a suitable labyrinth seal 46 or also embodiments known per se can also be provided.

The invention is not restricted to the examples of embodiment described above. On the contrary, other variants of the invention can also be derived therefrom by the person skilled in the art, without departing from the subject-matter of the invention. In particular, all the individual features described in connection with the examples of embodiment can also be combined with one another in a different way, without departing from the subject-matter of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE NUMBERS 2 cooler arrangement
4 fan module 6 frame device
8 electric motor
10 fan wheel
12 main cooler
14 charge air cooler
15 tube
16 main frame
18 charge air frame
20 seal
22 profile part
22a first profile section
22b second profile section
24 profile contour
26 border
28 joining contour
30 holding elements
32 seating
34 predefined buckling point
36 holding contour
38 extension
40 wall section
42 labyrinth contour
44 shaped element
46 labyrinth seal
H vertical direction
L longitudinal direction

What is claimed is:

1. A frame device for a fan module for a main cooler and for a charge air cooler of a motor vehicle, comprising:
a main frame for the main cooler and a charge air frame for the charge air cooler that is separate from the main cooler; and
a seal provided between the main frame and the charge air frame, wherein the seal includes an elastic profile part fastened at least to the main frame or to the charge air frame, wherein the profile part includes a hose-shaped first profile section, wherein the hose-shaped first profile section lies against the main frame when the profile part is fastened to the charge air frame or the profile part lies against the charge air frame when the profile part is fastened to the main frame, and wherein the first profile section includes an extension that extends in a vertical direction from the charge air frame to the main frame so that the first profile section is configured to buckle relative to the vertical direction when in an assembled state.

2. The frame device of claim 1, wherein the main frame or the charge air frame includes, on a border facing the respective other of the main frame or the charge air frame, hook-shaped holding elements for the profile part.

3. The frame device of claim 2, wherein the profile part includes a second profile section surrounding the border including the holding elements, and wherein the profile part includes a profile contour engaging a wall along the border, wherein profile contour engages a joining contour along the border.

4. The frame device of claim 1, wherein when the profile part is fastened to the main frame, a holding contour is arranged on the charge air frame to secure the profile part against slipping towards the main cooler or the charge air cooler, or wherein when the profile part is fastened to the charge air frame, the holding contour is arranged on the main frame.

5. The frame device of claim 1, wherein the main frame has a first wall section extending toward the charge air frame, the charge air frame has a second wall section extending toward the main frame, and wherein the first and second wall sections have labyrinth contours that intermesh to form a labyrinth seal.

6. A fan module comprising:
a first frame structure;
a main cooler secured to the first frame structure;
a second frame structure;
a charge air cooler secured to the second frame structure;
a fan secured to the first frame structure and configured to direct air across the main cooler and the charge air cooler via the first and second frame structures; and
an elastic seal disposed between the first frame and second frame, wherein the seal is configured to prevent air leakage between the first and second frame structures, wherein the seal has a U-shaped elastic end configured to engage a wall that protrudes from the second frame structure to secure the seal to the second frame structure, wherein the seal includes a hose-shaped elastic end opposite the U-shaped elastic end, and wherein the hose-shaped elastic end engages the first frame structure to prevent air leakage between the first and second frame structures.

7. The fan module of claim 6, wherein the U-shaped elastic end includes internal ribs and the wall includes external ribs, and wherein the internal ribs engage the external ribs to secure the seal to the second frame structure.

8. The fan module of claim 6, wherein the hose-shaped elastic end extends from the second frame structure to the first frame structure, and engages the first frame structure such that the hose-shaped elastic end buckles in direction that extends between the first frame structure and the second frame structure.

9. The fan module of claim 6, wherein the first frame structure includes a plurality of protrusions that engage the hose-shaped elastic end to secure the position of the seal.

10. The fan module of claim 6, wherein seal has a U-shaped elastic end configured to engage a wall that protrudes from the first frame structure to secure the seal to the first frame structure.

11. The fan module of claim 10, wherein the U-shaped elastic end includes internal ribs and the wall includes external ribs, and wherein the internal ribs engage the external ribs to secure the seal to the first frame structure.

12. The fan module of claim 6, wherein the seal includes a hose-shaped elastic end that is opposite the U-shaped elastic end, and wherein the hose-shaped elastic end engages the second frame structure to prevent air leakage between the first and second frame structures.

13. The fan module of claim 12, wherein the hose-shaped elastic end extends from the first frame structure to the second frame structure, and engages the second frame structure such that the hose-shaped elastic end buckles in direction that extends between the first frame structure and the second frame structure.

14. The fan module of claim 12, wherein the second frame structure includes a plurality of protrusions that engage the hose-shaped elastic end to secure the position of the seal.

15. The fan module of claim 6, wherein the first frame structure has a first wall section that extends toward the second frame structure and the second frame structure has a second wall section that extends toward the first frame structure, and wherein the first and second wall sections intermesh to form a labyrinth seal.

16. A fan module comprising:
a first frame structure defining a first set of protrusions;
a main cooler secured to the first frame structure;

a second frame structure defining a second set of protrusions that engage the first set of protrusions to form a labyrinth seal between the first and second frame structures, wherein the first set of protrusions forms a first contour and the second set of protrusions forms a second contour, and wherein a clearance space is defined between the first and second contours to facilitate relative movement between the first and second contours;

a charge air cooler secured to the second frame structure; and a fan secured to the first frame structure and configured to direct air across the main cooler and the charge air cooler via the first and second frame structures.

* * * * *